(12) United States Patent
Tanabe et al.

(10) Patent No.: US 9,961,504 B2
(45) Date of Patent: May 1, 2018

(54) MOBILE DEVICE, CONTROL METHOD, AND NON-TRANSITORY STORAGE MEDIUM

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/488,722

(22) Filed: Apr. 17, 2017

(65) Prior Publication Data

US 2017/0303093 A1 Oct. 19, 2017

(30) Foreign Application Priority Data

Apr. 18, 2016 (JP) .................................. 2016-083153

(51) Int. Cl.
*H04M 3/42* (2006.01)
*H04W 4/02* (2018.01)
*H04M 1/725* (2006.01)
*G06F 3/0488* (2013.01)
*G01C 22/00* (2006.01)
*G01C 17/02* (2006.01)

(52) U.S. Cl.
CPC ............ *H04W 4/027* (2013.01); *G01C 17/02* (2013.01); *G01C 22/006* (2013.01); *G06F 3/04883* (2013.01); *H04M 1/72569* (2013.01); *H04W 4/026* (2013.01); *G06F 2203/04808* (2013.01); *H04M 2250/10* (2013.01); *H04M 2250/12* (2013.01)

(58) Field of Classification Search
CPC . H04W 4/027; H04W 4/026; H04M 1/72569; H04M 2250/10; H04M 2250/12; G06F 3/04883; G06F 2203/04808; G01C 17/02; G01C 22/006
USPC ........................................ 455/414.1; 370/338
See application file for complete search history.

(56) References Cited

U.S. PATENT DOCUMENTS

2012/0101763 A1* 4/2012 Sambongi ............ G01C 22/006
702/97
2012/0184878 A1* 7/2012 Najafi .................. A61B 5/4833
600/592
2016/0313128 A1* 10/2016 Kobayashi .............. G01P 13/02

FOREIGN PATENT DOCUMENTS

JP 2014-27474 A 2/2014

* cited by examiner

*Primary Examiner* — Marcos Batista
(74) *Attorney, Agent, or Firm* — Hauptman Ham, LLP (57) ABSTRACT

A mobile device comprises a communicator configured to communicate with another communication device; an acceleration sensor configured to detect an acceleration value; a direction sensor configured to detect a change of a direction of the mobile device; and at least one controller configured to determine number of steps of a user of the mobile device based on the acceleration value, and a direction of walking of the user based on the change of the direction of the mobile device to perform notification to the other communication device through the communicator when cumulative number of steps of the walking of the user in one of directions exceeds a first value.

13 Claims, 6 Drawing Sheets

MOBILE DEVICE, CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2016-083153 filed in Japan on Apr. 18, 2016.

FIELD

The present application relates to a mobile device, a control method, and a non-transitory storage medium.

BACKGROUND

Mobile devices have a function for checking a position of a user using a Global Positioning System (GPS) receiver.

In the mobile devices, there is room for improvement in the function for checking the position of a travelling user.

SUMMARY

The present application relates to a mobile device, a control method, and a non-transitory storage medium.

According to one aspect, there is provided a mobile device comprising: a communicator configured to communicate with another communication device; an acceleration sensor configured to detect an acceleration value; a direction sensor configured to detect a change of a direction of the mobile device; and at least one controller configured to determine number of steps of a user of the mobile device base on the acceleration value, and a direction of walking of the user based on the change of the direction of the mobile device to perform notification to the other communication device through the communicator when cumulative number of steps of the walking of the user in one of directions exceeds a first value.

According to one aspect, there is provided a control method of a mobile device including a communicator configured to communicate with another communication device, an acceleration sensor configured to detect an acceleration value, and a direction sensor configured to detect a change of a direction of the mobile device, the control method comprising: determining number of steps of a user of the mobile device base on the acceleration value, and a direction of walking of the user based on the change of the direction of the mobile device; and performing notification to the other communication device through the communicator when cumulative number of steps of the walking of the user in one of directions exceeds a first value According to one aspect, there is provided a non-transitory storage medium that stores a control program for causing, when executed by a mobile device including a communicator configured to communicate with another communication device, an acceleration sensor configured to detect an acceleration value, and a direction sensor configured to detect a change of a direction of the mobile device, the mobile device to execute: determining number of steps of a user of the mobile device base on the acceleration value, and a direction of walking of the user based on the change of the direction of the mobile device; and performing notification to the other communication device through the communicator when cumulative number of steps of the walking of the user in one of directions exceeds a first value.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Exemplary embodiments for a mobile device, a control method, and a non-transitory storage medium according to the present application will be explained in detail below with reference to the accompanying drawings. A smartphone is explained below as an example of the mobile device. In the following description, the same reference signs may be assigned to the same components. Moreover, redundant explanations may be omitted.

Figure 1:
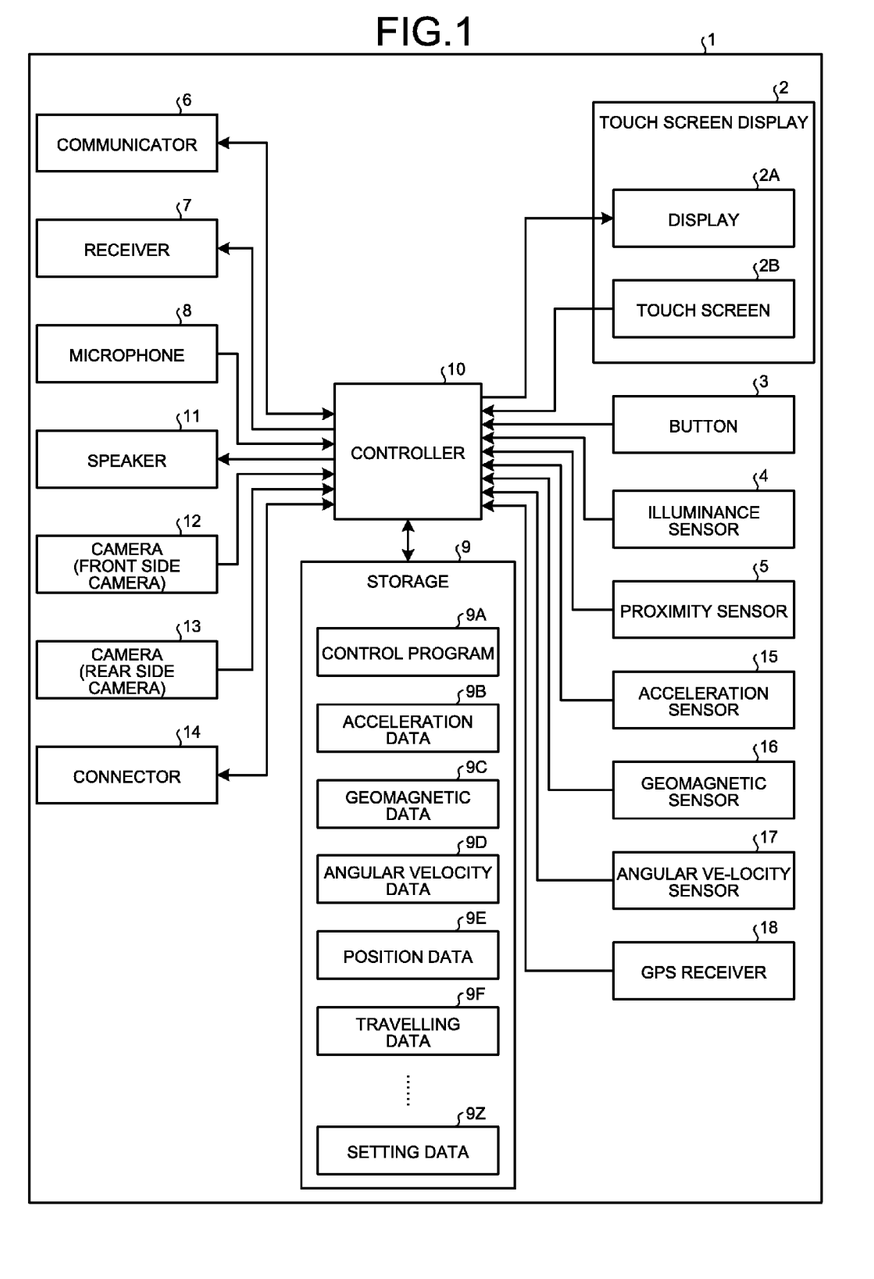
FIG. 1 is a block diagram illustrating a functional configuration of a smartphone.

An example of a functional configuration of a smartphone 1 according to an example of the embodiments will be explained with reference to FIG. 1. FIG. 1 is a block diagram illustrating a functional configuration of the smartphone 1.

As illustrated in FIG. 1, the smartphone 1 includes a touch screen display 2, one or more buttons 3, an illuminance sensor 4, a proximity sensor 5, a communicator 6, a receiver 7, a microphone 8, a storage 9, a controller 10, a speaker 11, a camera 12, a camera 13, a connector 14, an acceleration sensor 15, a geomagnetic sensor 16, an angular velocity sensor 17, and a GPS receiver 18. In the following description, the smartphone 1 may be referred to as "own equipment" or "own device".

The touch screen display 2 includes a display 2A and a touch screen 2B. For example, the display 2A and the touch screen 2B may be located in an overlapping manner, or may be located side by side, or may be located apart from each other. When the display 2A and the touch screen 2B are located in an overlapping manner, for example, one or more sides of the display 2A does not have to be along any of the sides of the touch screen 2B.

The display 2A includes a display device such as a Liquid Crystal Display (LCD), an Organic Electro-Luminescence Display (OELD), or an Inorganic Electro-Luminescence Display (IELD). The display 2A can display an object such as characters, images, symbols, and graphics in a screen.

The touch screen 2B can detect contact or proximity of one or more fingers, one or more pens, or one or more stylus pens or the like with respect to the touch screen 2B. The touch screen 2B can detect a position or positions on the touch screen 2B where one or more fingers, one or more pens, or one or more stylus pens or the like is (are) in contact with or proximity to the touch screen 2B. The finger, pen, and stylus pen detected by the touch screen 2B are sometimes referred to as "the finger". In some embodiments, as a detection method of the touch screen 2B, a capacitive type detection method, a resistive type detection method, or a load sensing type detection method can be appropriately adopted.

The controller 10 can determine a type of gestures based on a detection result detected by the touch screen 2B. The detection result includes, for example, the number of contacts, a position where the contact is detected, a change of a position where the contact is detected, a temporal length of contact detection, a time interval between detected contacts, and the number of times the contact is detected. The operation that the controller 10 can perform can be performed by the smartphone 1 with the controller 10. In other words, the operation performed by the controller 10 may be performed by the smartphone 1. The gesture is an operation performed on the touch screen 2B using the finger. The operation performed on the touch screen 2B may also be performed on the touch screen display 2 having the touch screen 2B. Examples of the gestures determined by the controller 10 through the touch screen 2B include, but are not limited to, touch, long touch, release, swipe, tap, double tap, long tap, drag, flick, pinch in, and pinch out.

The button 3 receives an operation input of the user. When receiving the operation input of the user, the button 3 notifies the controller 10 that the operation input has been received. The number of buttons 3 may be singular or plural.

The illuminance sensor 4 can detect illuminance. The illuminance is a value of luminous flux incident on a unit area of a measurement surface of the illuminance sensor 4. The illuminance sensor 4 may be used, for example, to adjust the luminance of the display 2A.

The proximity sensor 5 can detect presence of a nearby object in a noncontact manner. The proximity sensor 5 detects the presence of the object based on a change in a magnetic field or a change in a feedback time of a reflected wave of an ultrasonic wave, or the like. The proximity sensor 5 may be used, for example, to detect that the user's face is brought close to the display 2A. The illuminance sensor 4 and the proximity sensor 5 may be configured as one sensor. The illuminance sensor 4 may be used as the proximity sensor.

The communicator 6 can communicate wirelessly. The communicator 6 supports a wireless communication standard. The wireless communication standard supported by the communicator 6 includes, for example, cellularphone communication standards such as 2G, 3G, and 4G, and short-range wireless communication standards. The cellularphone communication standard includes, for example, Long Term Evolution (LTE), Wideband Code Division Multiple Access (W-CDMA), Worldwide Interoperability for Microwave Access (WiMAX), CDMA 2000, Personal Digital Cellular (PDC), Global System for Mobile Communications (GSM) (registered trademark), and Personal Handy-phone System (PHS). The short range wireless communication standard includes, for example, IEEE 802.11 (IEEE is an abbreviation for The Institute of Electrical and Electronics Engineers, Inc.), Bluetooth (registered trademark), Infrared Data Association (IrDA), Near Field Communication (NFC), and Wireless Personal Area Network (WPAN). A WPAN communication standard includes, for example, ZigBee (registered trademark), Digital Enhanced Cordless Telecommunications (DECT), Z-Wave, and Wireless Smart Utility Network (WiSun). The communicator 6 may support one or more of the communication standards.

The receiver 7 can output a sound signal transmitted from the controller 10 as a sound. The receiver 7 can output, for example, a sound of a moving image and a sound of a music reproduced by the smartphone 1 and a voice of a partner on calling. The microphone 8 converts the voice of the user or the like to the sound signal and transmits the sound signal to the controller 10.

The storage 9 can store programs and data. The storage 9 may be used as a work area that temporarily stores processing results of the controller 10. The storage 9 may include any non-transitory storage medium such as a semiconductor storage medium and a magnetic storage medium. The storage 9 may include a plurality of types of storage mediums. The storage 9 may include a combination of a storage medium such as a memory card, an optical disk, or a magneto-optical disk with a reading device of the storage medium. The storage 9 may include a storage device used as a temporary storage area such as Random Access Memory (RAM).

The programs stored in the storage 9 include applications executed in the foreground or the background and a basic program for assisting operations of the applications. For example, a screen for the application executed in the foreground is displayed on the display 2A. The basic program includes, for example, an OS. The applications and the basic program may be installed in the storage 9 through wireless communication by the communicator 6 or through a non-transitory storage medium.

The storage 9 can store, for example, a control program 9A, acceleration data 9B, geomagnetic data 9C, angular velocity data 9D, position data 9E, travelling data 9F, and setting data 9Z. The acceleration data 9B includes information related to an acceleration value detected by the acceleration sensor 15. The geomagnetic data 9C includes information related to a geomagnetism value detected by the geomagnetic sensor 16. The angular velocity data 9D includes information related to an angular velocity value detected by the angular velocity sensor 17. The position data 9E includes information related to a position received by the GPS receiver 18. The travelling data 9F includes information related to the number of steps of the user and a travelling time, and the like. The setting data 9Z includes information related to various settings for the operations of the smartphone 1.

The control program 9A can provide functions related to various types of control in order to operate the smartphone 1. The control program 9A controls, for example, the communicator 6, the receiver 7, and the microphone 8 to make a phone call. The function provided by the control program 9A includes functions for performing various controls such as changing information displayed on the display 2A according to a gesture detected through the touch screen 2B. The function provided by the control program 9A includes a function for determining a travelling state of the user carrying the smartphone 1 by controlling the acceleration sensor 15, the geomagnetic sensor 16, and the angular velocity sensor 17 or the like. The travelling state includes, for example, a state in which the user is walking and a state in which the user is travelling on a bicycle. The walking includes, for example, user's walking and a user's running.

The control program 9A can provide a function for counting the number of the steps of the user carrying the smartphone 1 based on the acceleration value detected by the acceleration sensor 15. The control program 9A can provide a function for determining a direction in which the user is walking based on the acceleration value detected by the acceleration sensor 15 and the geomagnetism value detected by the geomagnetic sensor 16. The control program 9A can provide a function for determining a direction in which the user is walking based on the acceleration value detected by the acceleration sensor 15 and the angular velocity value detected by the angular velocity sensor 17.

The acceleration data 9B includes a plurality of pieces of acceleration information transmitted to the controller 10 as the detection results of the acceleration sensor 15. The acceleration data 9B can provide the pieces of the acceleration information in time series. The acceleration information includes, for example, a time and an acceleration value. The time indicates a time at which the direction and magnitude of the acceleration are detected by the acceleration sensor 15. The acceleration value indicates the direction and the magnitude of the acceleration detected by the acceleration sensor 15.

For example, the detection result of the acceleration sensor 15 is transmitted to the controller 10. The detection result includes an acceleration value in an X-axis direction, an acceleration value in a Y-axis direction, an acceleration value in a Z-axis direction, and a vector value obtained by combining the acceleration values. The controller 10 logs the detection result of the acceleration sensor 15 in the acceleration data 9B of the storage 9. The controller 10 may calculate a resultant vector based on the acceleration value in the X-axis direction, the acceleration value in the Y-axis direction, and the acceleration value in the Z-axis direction.

The geomagnetic data 9C includes a plurality of pieces of geomagnetic information transmitted to the controller 10 as the detection results of the geomagnetic sensor 16. The geomagnetic data 9C can provide the pieces of the geomagnetic information in time series. The geomagnetic information includes, for example, a time and a geomagnetism value. The time indicates a time when the geomagnetism value is detected by the geomagnetic sensor 16. The geomagnetism value indicates a geomagnetism value detected by the geomagnetic sensor 16. The controller 10 logs the detection result of the geomagnetic sensor 16 in the geomagnetic data 9C of the storage 9.

The angular velocity data 9D includes a plurality of pieces of angular velocity information transmitted to the controller 10 as the detection results of the angular velocity sensor 17. The angular velocity data 9D can provide the pieces of the angular velocity information in time series. The angular velocity information includes, for example, a time and an angular velocity value. The time indicates a time when the angular velocity value is detected by the angular velocity sensor 17. The angular velocity value indicates an angular velocity value detected by the angular velocity sensor 17. The controller 10 logs the detection result of the angular velocity sensor 17 in the angular velocity data 9D of the storage 9.

The position data 9E includes a plurality of pieces of position information. The position data 9E can provide the pieces of the position information in time series. The position information includes, for example, latitude, longitude, and a time. The latitude and longitude indicate the current position detected by the GPS receiver 18. The time indicates a time when the GPS receiver 18 detects the position information.

The travelling data 9F includes a cumulative number of steps for each of a plurality of directions in a predetermined area. For example, when the number of steps of the user is counted, the cumulative number of steps in the travelling data 9F is updated. The travelling data 9F may include, for example, a total number of steps after starting to monitor the travelling of the user.

The setting data 9Z includes various data used for processing performed based on the functions provided by the control program 9A or the like. The setting data 9Z includes determination condition information used to determine the travelling state of the user carrying the smartphone 1. The determination condition information may include, for example, the direction and the magnitude of the acceleration acting on the smartphone 1 or an acceleration pattern presented by a change of the direction and the magnitude of the acceleration in time series.

The setting data 9Z includes determination information used to determine the cumulative number of steps of the user. The determination information includes, for example, a first value and a second value. The first value and the second value can be, for example, the number of steps. The first value is used when it is determined whether the travelling of the user is to be notified to other communication device. The second value is used when it is determined whether the position information of the user is to be acquired. For example, the second value is a value for determining whether the first value is to be changed based on the counted number of steps. The second value can be a value for determining, for example, a timing at which the GPS receiver 18 is caused to receive the position information. When a predetermined number of steps, for example, 5 steps or 10 steps, is used as the second value, the position information of the user can be received for each predetermined number of steps. When the second value is set larger, the reception frequency of the GPS receiver 18 is reduced, and the power consumption of the smartphone 1 can be reduced.

The controller 10 can implement various functions by integrally controlling the operations of the smartphone 1. The controller 10 includes a processor. Examples of the processor include, but are not limited to, a Central Processing Unit (CPU), a System-on-a-chip (SoC), a Micro Control Unit (MCU), a Field-Programmable Gate Array (FPGA), and a coprocessor. The SoC may be integrated with other components such as the communicator 6. The controller 10 is an example of the controller.

Specifically, the controller 10 can execute commands included in the program stored in the storage 9. The controller 10 can refer to data stored in the storage 9 as necessary. The controller 10 controls function modules according to the data and the commands. The controller 10 implements the various functions by controlling the function modules. Examples of the function modules include, but are not limited to, the display 2A, the communicator 6, the receiver 7, and the speaker 11. The controller 10 can change the control according to the detection result of a detector. Examples of the detector include, but are not limited to, the touch screen 2B, the button 3, the illuminance sensor 4, the proximity sensor 5, the microphone 8, the camera 12, the camera 13, the acceleration sensor 15, the geomagnetic sensor 16, the angular velocity sensor 17, and the GPS receiver 18.

For example, by executing the control program 9A, the controller 10 can perform the various controls such as changing the information displayed on the display 2A according to the gesture detected through the touch screen 2B.

By executing the control program 9A, the controller 10 cooperates with the acceleration sensor 15, the geomagnetic sensor 16, the angular velocity sensor 17, and the GPS receiver 18. The controller 10 performs processing of determining whether the user carrying the smartphone 1 is walking based on the detection result of the acceleration sensor 15.

By executing the control program 9A, the controller 10 can count the number of steps of the user carrying the smartphone 1 based on the acceleration value and the acceleration pattern etc. detected by the acceleration sensor 15. For example, when the acceleration pattern detected by the acceleration sensor 15 matches an acceleration pattern of a predetermined one step, the controller 10 can count one as the number of steps.

The speaker 11 can output a sound signal transmitted from the controller 10 as a sound. The speaker 11 may output, for example, a ring tone and music. One of the receiver 7 and the speaker 11 may also execute functions of the other.

The camera 12 and the camera 13 can convert a captured image into an electric signal. The camera 12 may be a front side camera for capturing an object facing the display 2A. The camera 13 may be a rear side camera for capturing an object facing the opposite side of the display 2A. The camera 12 and the camera 13 may be mounted on the smartphone 1 in a state in which both of the cameras are functionally and physically integrated as one camera unit that can be used as a front side camera and a rear side camera by switching thereof.

The connector 14 includes a terminal connected with other device. The connector 14 may include a general-purpose terminal such as a Universal Serial Bus (USB), a High-Definition Multimedia Interface (HDMI (registered trademark)), Light Peak (Thunderbolt (registered trademark)), and an earphone/microphone connector. The connector 14 may be a dedicated terminal such as a dock connector. Examples of the devices connected to the connector 14 include, but are not limited to, an external storage, a speaker, and a communication device.

The acceleration sensor 15 can detect a direction and magnitude of an acceleration acting on the smartphone 1. The acceleration sensor 15 can transmit the detected acceleration value to the controller 10. The controller 10 may detect a change in the travelling state of the smartphone 1 based on the direction and the magnitude of the acceleration detected by the acceleration sensor 15 or based on an acceleration pattern including a change of the direction and the magnitude of the acceleration in time series.

The geomagnetic sensor 16 can detect an orientation (direction) of the smartphone 1 by measuring, for example, geomagnetism. The geomagnetic sensor 16 can transmit the detected geomagnetism value to the controller 10. The geomagnetic sensor 16 may be either a biaxial type or a triaxial type. The geomagnetic sensor 16 may detect an orientation and magnitude of a magnetic field. The controller 10 can detect a travelling direction of the user based on the geomagnetism value detected by the geomagnetic sensor 16.

The angular velocity sensor 17 can measure, for example, a direction and magnitude of an angular velocity of the smartphone 1. The angular velocity sensor 17 can transmit the detected angular velocity value to the controller 10. The controller 10 can detect a change in an orientation of the smartphone 1 based on the direction and the magnitude of the angular velocity detected by the angular velocity sensor 17 or based on an angular velocity pattern including a change of the direction and the magnitude of the angular velocity in time series. For example, in an environment where the geomagnetism cannot be detected, the controller 10 can change the direction of the smartphone 1 based on the change in the orientation of the smartphone 1.

The GPS receiver 18 can detect the current position of the smartphone 1. The GPS receiver 18 is an example of a receiver. The GPS receiver 18 can perform demodulation processing on the received radio signal and transmit the processed signal to the controller 10. In the present embodiment, a case in which the smartphone 1 has the GPS receiver 18 as the receiver is explained, however, the receiver is not limited thereto. For example, the smartphone 1 may detect the current position based on a base station used when the communicator 6 performs wireless communication. In this case, the communicator 6 is an example of the receiver. For example, the smartphone 1 may detect the current position by combining a plurality of methods.

The controller 10 may combine outputs of the acceleration sensor 15, the geomagnetic sensor 16, and the angular velocity sensor 17. By using a combination of the outputs of the sensors, the smartphone 1 can perform the control that highly reflects the travelling thereof using the controller 10. The acceleration sensor 15, the geomagnetic sensor 16, and the angular velocity sensor 17 may be used as one single motion sensor.

A part or all of the programs and the data stored in the storage 9 in FIG. 1 may be downloaded from any other device through wireless communication by the communicator 6. A part or all of the programs and the data stored in the storage 9 in FIG. 1 may be stored in a non-transitory storage medium that can be read by a reading device included in the storage 9. A part or all of the programs and the data stored in the storage 9 in FIG. 1 may be stored in a non-transitory storage medium that can be read by a reading device connected to the connector 14. Examples of the non-transitory storage mediums include, but are not limited to, an optical disk such as a compact disk (CD: registered trademark), a digital versatile disk (DVD: registered trademark), and Blu-ray (registered trademark), a magneto-optical disk, a magnetic storage medium, a memory card, and a solid-state storage medium.

Figure 2:
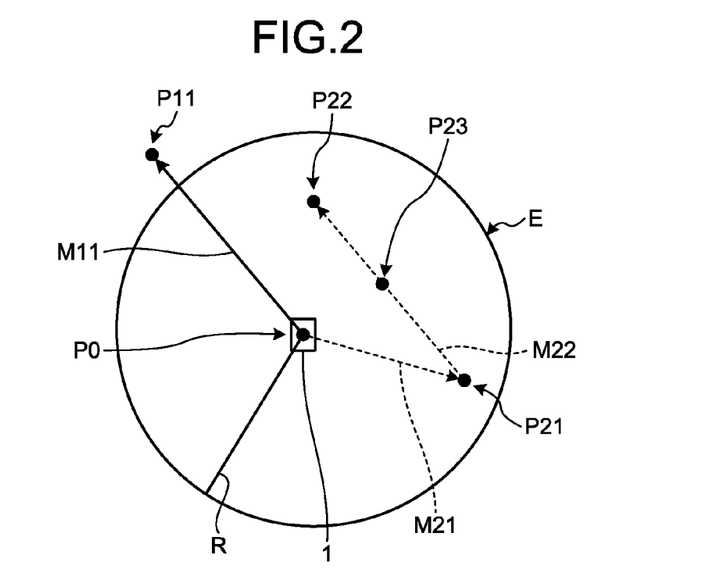
FIG. 2 is a diagram for explaining an example of control of the smartphone.
Figure 3:
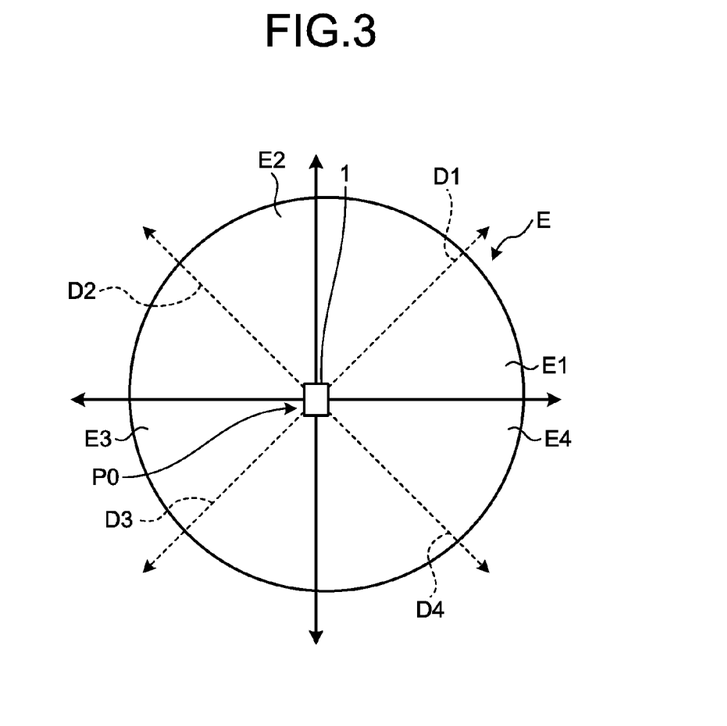
FIG. 3 is a diagram illustrating an example of a relationship between an area and directions.

FIG. 2 is a diagram for explaining an example of control of the smartphone 1. FIG. 3 is a diagram illustrating an example of a relationship between an area and directions. An example of the control related to notification of the smartphone 1 will be explained below with reference to FIG. 2 and FIG. 3.

For example, there is a case in which a guardian may temporarily leave a child when he/she goes out with the child. In such a case, the guardian is relieved as long as the child is within a specific area. The specific area includes, for example, a location near the guardian, a park, a meeting place, a resting place, and a schoolyard. The smartphone 1 is carried by a user who is a monitoring target of travelling. The user includes a child, an elderly person, and the like protected by a guardian. The smartphone 1 can provide a function of performing notification to other communication device when the user as a monitoring target of travelling goes out of the specific area. The other communication device includes, for example, a communication device carried by the guardian.

In the examples of FIG. 2 and FIG. 3, an area E is an area where the user whose travelling is monitored is permitted to travel. The area E is an area centered on a position P0 where the user is located at a start of monitoring thereof and having a first value R as a radius. The position P0 can be determined based on the position information received by the GPS receiver 18. As the first value R, for example, it is possible to use a user's stride and the number of steps based on ages etc. As the first value R, for example, it is possible to use the number of steps that reaches outside of the area when the user walks continuously with a predetermined stride. The walking continuously means a continuous walk which includes, for example, a temporary stop and a change in a direction. The first value R may be a value of a distance based on the number of steps of the user. In the present embodiment, a case will be explained in which the first value R is, for example, 50 steps as an initial value of the number of steps.

For example, there may be a case in which a direction error may occur in the detection result of the geomagnetic sensor 16. As illustrated in FIG. 3, the smartphone 1 divides the area E based on the position P0. The smartphone 1 defines directions from the position P0 with respect to divided areas E1, E2, E3, and E4 as directions D1, D2, D3, and D4 respectively. The direction D1 is a direction in which the user is travelling toward the area E1. The direction D2 is a direction in which the user is travelling toward the area E2. The direction D3 is a direction in which the user is travelling toward the area E3. The direction D4 is a direction in which the user is travelling toward the area E4. By determining the direction to which the user travels based on the four directions D1, D2, D3, and D4, the smartphone 1 can reduce influence of the direction error of the geomagnetic sensor 16 at low load.

In the examples of FIG. 2 and FIG. 3, the travelling data 9F includes four cumulative numbers of steps for the respective directions D1, D2, D3, and D4 and one cumulative number of steps for all the directions D1, D2, D3, and D4. After determining the direction in which the user travels based on the acceleration value and the geomagnetism value, the smartphone 1 updates the cumulative number of steps corresponding to the relevant direction with the counted number of steps.

In the examples of FIG. 2 and FIG. 3, a case where the area E in the smartphone 1 is a circular shape has been explained, however, the area is not limited thereto. For example, a shape of a place where the user is located may be used as the shape of the area E. The shape of the area E includes a shape such as an ellipse, a semicircle, a rectangle, and a polygon. The shape of the area E may be an outer shape of a room, a park, or the like. The smartphone 1 will be explained below in a case where the area E is divided into four areas, however, the area E is not limited thereto. For example, the smartphone 1 may divide the area E into 8, 16, 32 areas, and the like.

As illustrated in FIG. 2, a travelling route M11 indicates that the user continuously travels from the position P0 toward the position P11 of the area E. The position P11 is a position outside the area E. The position P11 is a position that the user reaches when he/she travels continuously from the position P0 and the number of steps exceeds the 50 steps.

After detecting that the user starts travelling from the position P0 based on the acceleration value detected by the acceleration sensor 15, the smartphone 1 counts the number of steps of the user. When the user is travelling, the smartphone 1 determines a direction in which the user is travelling based on at least one of the geomagnetism value and the angular velocity value. For example, the smartphone 1 detects the orientation (direction) of the smartphone 1 based on the geomagnetism value, and can determine the direction of the travelling of the user based on the detected orientation (direction). For example, it is possible that the smartphone 1 detects a change in the orientation of the smartphone 1 based on the angular velocity value and determines the direction of the travelling of the user based on the change in the orientation. For example, by determining the direction of the travelling of the user based on the geomagnetism value and the angular velocity value, the determination accuracy of the smartphone 1 can be improved.

In an example of the travelling route M11, the smartphone 1 determines the travelling direction of the user as the direction D2 based on the geomagnetism value and the angular velocity value. The smartphone 1 adds the counted number of steps to the cumulative number of steps for the direction D2. The smartphone 1 determines whether the cumulative number of steps for the direction D2 exceeds the first value R. When the cumulative number of steps for the direction D2 does not exceed the first value R, the smartphone 1 determines that the user has not reached the position P11 and is still within the area E. In this case, the smartphone 1 does not perform the notification to other communication device through the communicator 6.

When the cumulative number of steps for the direction D2 exceeds the first value R, the smartphone 1 determines that the user has reached the position P11 outside the area E. In this case, the smartphone 1 performs the notification to other communication device through the communicator 6. The notification includes, for example, notification that the user has travelled to the outside of the area E. The smartphone 1 may transmit the position information when the cumulative number of steps for the direction D2 has exceeded the first value R to other communication device. Thus, the other communication device can notify the guardian that the user has been out of the area E.

In this way, when the cumulative number of steps for any of the directions has exceeded the first value while determining the direction in which the user travels, the smartphone 1 can perform the notification to other communication device. The smartphone 1 can determine the travelling direction and the number of steps of the user based on the acceleration value and the geomagnetism value or based on the acceleration value and the angular velocity value. As a result, the smartphone 1 can monitor the travelling of the user based on the detection results of the sensors without frequently operating the GPS receiver 18. The smartphone 1 only has to drive the sensors for monitoring the travelling of the user, thus can achieve power consumption. Moreover, even if the user is located in any place where the GPS receiver 18 cannot receive signals or the reception accuracy is poor, the smartphone 1 can monitor the travelling of the user based on the detection results of the sensors. By determining the travelling of the user based on the number of steps and the direction, the smartphone 1 can improve the determination accuracy even when the user does not travel linearly.

As illustrated in FIG. 2, travelling routes M21 and M22 are continuous travelling routes of the user. The travelling route M21 indicates that the user travels from the position P0 to a position P21 in the direction D4 of the area E. The travelling route M22 indicates that the user changes the travelling direction to the direction D2 of the area E2 at the position P21 and travels to a position P22. The positions P21 and P22 are positions within the area E. The distance of the travelling route M21 is a travelling distance of the user to the position P21 that is within 50 steps from the position P0. The distance of the travelling route M22 is the same travelling distance as the travelling route M11. That is, the distance of the travelling route M22 is a distance that exceeds the first value R.

On the travelling route M21, after detecting that the user starts travelling from the position P0 based on the acceleration value detected by the acceleration sensor 15, the smartphone 1 counts the number of steps of the user. When the user is travelling, the smartphone 1 determines that the travelling direction of the user is the direction D4 based on the geomagnetism value and the angular velocity value. The smartphone 1 adds the counted number of steps to the cumulative number of steps for the direction D4. The smartphone 1 determines whether the cumulative number of steps added has exceeded the first value R. When the user has reached the position P21 within the area E, the cumulative number of steps for the direction D4 does not exceeded the first value R. In this case, the smartphone 1 does not perform the notification to the other communication device through the communicator 6.

After reaching the position P21, the user changes the direction of the travelling and continues travelling toward the position P22 within the area E.

As illustrated in the travelling route M22, after detecting the travelling from the position P21 based on the acceleration value detected by the acceleration sensor 15, the smartphone 1 counts the number of steps of the user. When the user is travelling, the smartphone 1 determines that the travelling direction of the user is the direction D2 based on the geomagnetism value and the angular velocity value. When detecting that the user changes the direction to the opposite direction, the smartphone 1 subtracts the counted number of steps from the cumulative number of steps for the direction D2 and the cumulative number of steps for all the directions D1, D2, D3, and D4.

In the scenes illustrated in FIG. 2 and FIG. 3, the second value in the setting data 9Z is set to 50 steps. At a position P23 between the position P21 and the position P22 on the travelling route M22, the smartphone 1 determines that the counted number of steps (total number of steps) has exceeded the second value. In this case, the smartphone 1 receives the position information through the GPS receiver 18 and changes the first value R based on the position information. For example, the smartphone 1 determines the position thereof based on the acquired position information and changes the first value R based on a displacement amount of the position thereof. For example, when the position of the smartphone 1 is located at a position away by 25 steps in the opposite direction of the travelling direction, the smartphone 1 adds the value corresponding to the 25 steps to the first value R. In other words, the smartphone 1 changes the first value R based on the number of steps that cancels out the number of steps in the direction different from the travelling direction. When the smartphone 1 changes the first value R, the smartphone 1 also resets the cumulative numbers of steps for the directions D1, D2, D3, and D4 to 0.

The user continues travelling from the position P23 to the position P22. Thereafter, when the user has reached the position P22 within the area E, the cumulative number of steps for the direction D2 does not exceed the first value R. In this case, the cumulative number of steps for the direction D2 in which the user travels continuously from the position P21 to the position P22 becomes the number of steps that exceeds the first value R before the change. However, the smartphone 1 has changed the first value R based on the position information at the position P23 which is in the middle of the travelling route M22, and resets the cumulative number of steps to 0. As a result, the smartphone 1 can prevent erroneous determination that may occur when the cumulative number of steps exceeds the first value even though the user is within the area E. Therefore, the smartphone 1 is capable of preventing the notification to other communication device that may be performed despite the user being within the area E.

Figure 4:
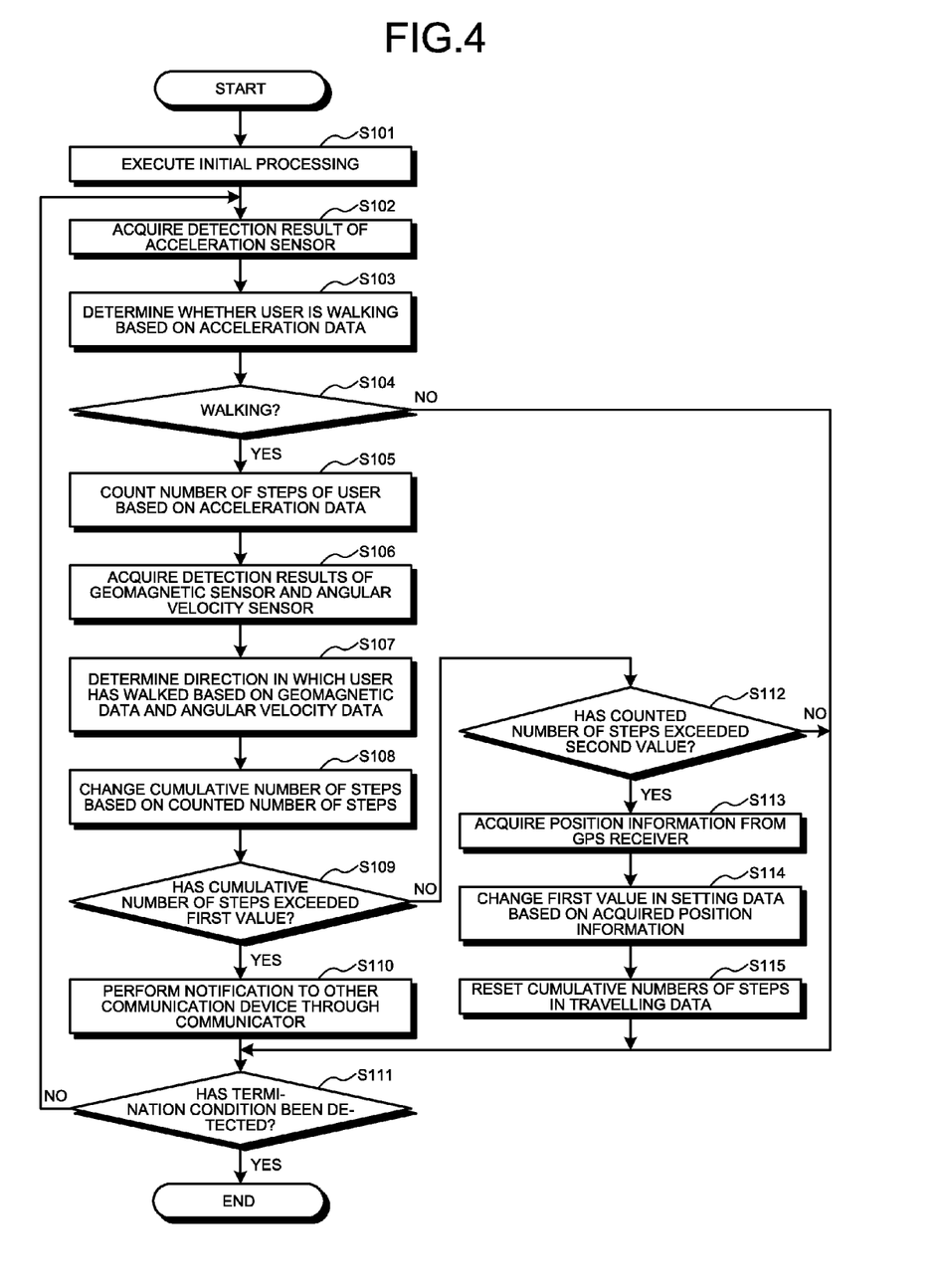
FIG. 4 is a flowchart illustrating a procedure of the example of the control by the smartphone.

FIG. 4 is a flowchart illustrating a procedure of the example of the control by the smartphone 1. The procedure illustrated in FIG. 4 is implemented by the controller 10 executing the control program 9A. The procedure illustrated in FIG. 4 is repeatedly executed by the controller 10. The procedure illustrated in FIG. 4 may be configured to start execution according to, for example, a predetermined trigger. The predetermined trigger includes, for example, cases when a pairing state with other communication device is disconnected, when the smartphone 1 is started up, when a monitoring request is accepted, and when it is detected that the travelling of the smartphone 1 is started.

As illustrated in FIG. 4, the controller 10 of the smartphone 1 executes initial processing at Step S101. For example, when executing the initial processing, the controller 10 can execute processing of determining the first value R and a plurality of directions based on the current position of the smartphone 1, the geomagnetism value, the angular velocity value, and the like. As for the directions, any one of 4, 8, and 16 directions can be set. Upon completion of the initial processing, the controller 10 proceeds to Step S102.

At Step S102, the controller 10 acquires the detection result of the acceleration sensor 15. For example, the controller 10 stores the acquired detection result in the acceleration data 9B. At Step S103, the controller 10 determines whether the user is walking based on the acceleration data 9B. For example, when the acceleration pattern indicated by the acceleration data 9B matches the acceleration pattern when the user is walking, the controller 10 determines that the user is walking. When it is determined that the user is walking (Yes at Step S104), the controller 10 proceeds to Step S105.

At Step S105, the controller 10 counts the number of steps of the user based on the acceleration data 9B. For example, the controller 10 counts the number of steps by executing a counting process of counting the number of steps of the user carrying the smartphone 1 based on the acceleration value of the acceleration data 9B. The controller 10 reflects the counted number of steps to the total number of steps in the travelling data 9F and proceeds to Step S106.

At Step S106, the controller 10 acquires the detection results of the geomagnetic sensor 16 and the angular velocity sensor 17. For example, the controller 10 stores the acquired detection results in the geomagnetic data 9C and the angular velocity data 9D. At Step S107, the controller 10 determines the direction in which the user has walked based on the geomagnetic data 9C and the angular velocity data 9D. For example, it is possible that the controller 10 detects the orientation (direction) of the smartphone 1 based on the geomagnetism value and the angular velocity value and determines the direction of the travelling of the user based on the orientation (direction). The controller 10 determines the direction and proceeds to Step S108.

At Step S108, the controller 10 changes the cumulative number of steps based on the counted number of steps. For example, the controller 10 reflects the counted number of steps to the cumulative number of steps for the direction determined at Step S107. For example, when the determined direction is changed, the controller 10 changes the cumulative numbers of steps for the directions different from the determined direction. Upon completion of the change in the cumulative number of steps, the controller 10 proceeds to Step S109.

At Step S109, the controller 10 compares the cumulative number of steps with the first value R to determine whether the cumulative number of steps has exceeded the first value R. When the cumulative number of steps has exceeded the first value R (Yes at Step S109), the controller 10 proceeds to Step S110. At Step S110, the controller 10 performs the notification to other communication device through the communicator 6. For example, the controller 10 may transmit information for the notification that the cumulative number of steps has exceeded the first value R to other communication device. For example, the controller 10 may transmit the information for the notification that the user has been out of the specific area to other communication device. Upon completion of the notification, the controller 10 proceeds to Step S111.

At Step S111, the controller 10 determines whether a termination condition has been detected. The termination condition includes conditions such as detecting that a monitoring termination request is accepted, detecting re-pairing with other communication device, and detecting that the user's stop state is continued for a predetermined time. When it is determined that the termination condition has not been detected (No at Step S111), the controller 10 returns to Step S102, which has already been described. When it is determined that the termination condition has been detected (Yes at Step S111), the controller 10 ends the procedure illustrated in FIG. 4.

When the cumulative number of steps has not exceeded the first value R (No at Step S109), the controller 10 proceeds to Step S112. At Step S112, the controller 10 compares the counted number of steps with the second value. For example, the counted number of steps includes the total number of steps. When the counted number of steps has not exceeded the second value (No at Step S112), the controller 10 proceeds to Step S111, which has already been described. When the counted number of steps has exceeded the second value (Yes at Step S112), the controller 10 proceeds to Step S113.

At Step S113, the controller 10 acquires the position information from the GPS receiver 18. For example, the controller 10 causes the GPS receiver 18 to receive the position information and stores the position information acquired from the GPS receiver 18 in the position data 9E. Upon acquisition of the position information, the controller 10 proceeds to Step S114.

At Step S114, the controller 10 changes the first value R in the setting data 9Z based on the acquired position information. For example, the controller 10 determines the position of the smartphone 1 based on the acquired position information, and changes the first value R based on a displacement amount of the position of the smartphone 1. For example, the controller 10 changes the first value R based on the number of steps that cancels out the number of steps in the direction different from the travelling direction. At Step S115, the controller 10 resets the cumulative numbers of steps in the travelling data 9F. For example, the controller 10 resets a plurality of cumulative numbers of steps corresponding to a plurality of directions to 0. Upon completion of the reset of the cumulative numbers of steps, the controller 10 proceeds to Step S111 which has already been described.

When it is determined that the user is not walking (No at Step S104), the controller 10 proceeds to Step S111 which has already been described.

The embodiments disclosed in the present application can be modified within a scope that does not depart from the gist and the scope of the invention. Moreover, the embodiments disclosed in the present application can be combined with each other if necessary. For example, the embodiments may be modified as follows.

For example, the programs illustrated in FIG. 1 may be divided into a plurality of modules, or may be combined with other programs.

In the embodiments, the case in which the smartphone 1 uses one first value R for four directions has been explained, however, the embodiments are not limited thereto. For example, the smartphone 1 may provide the first value R for each of the directions.

Figure 5:
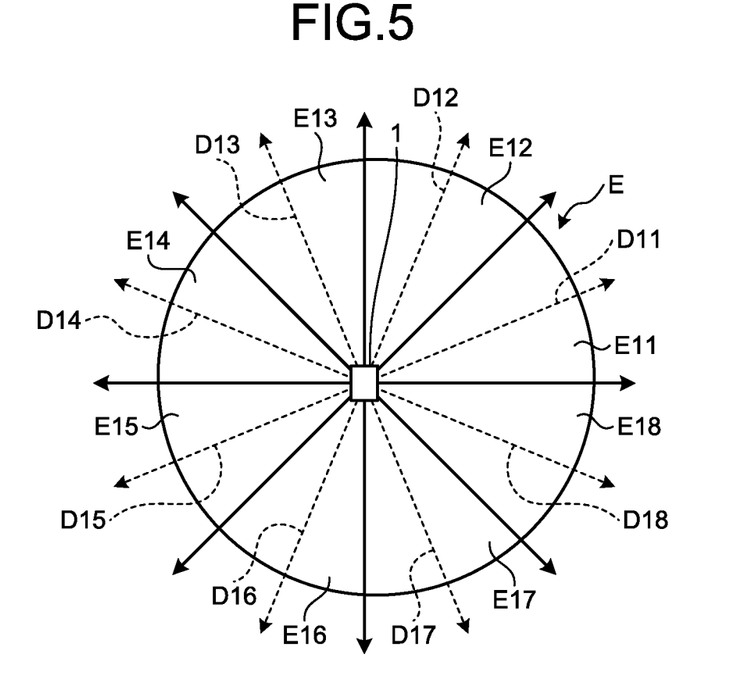
FIG. 5 is a diagram illustrating another example of the relationship between the area and the directions.

FIG. 5 is a diagram illustrating another example of the relationship between the area and the directions. Another example of the control related to the notification of the smartphone 1 will be explained below with reference to FIG. 5. The smartphone 1 according to another example of the embodiments has the same configuration as that of the smartphone 1 illustrated in FIG. 1 except for different functions of the control program 9A.

As illustrated in FIG. 5, the smartphone 1 divides the area E based on the current position of the smartphone 1. The smartphone 1 defines directions from the current position with respect to divided areas E11, E12, E13, E14, E15, E16, E17, and E18 as directions D11, D12, D13, D14, D15, D16, D17, and D18, respectively. The smartphone 1 determines each cumulative number of steps in eight directions. The smartphone 1 stores the first value R for each of the eight directions in the setting data 9Z. The smartphone 1 can set the different first value R for each of the eight directions. By setting the different first value R for each of the eight directions, the smartphone 1 can monitor the travelling of the user even in an area having a shape different from the circle. The smartphone 1 can set an arbitrary position selected by the user as a reference position of the area E.

When the smartphone 1 determines the direction in which the user has walked by executing the control program 9A, the smartphone 1 compares the cumulative number of steps corresponding to the direction with the first value R. When the cumulative number of steps corresponding to the direction has exceeded the first value R, the smartphone 1 performs the notification to other communication device through the communicator 6.

Figure 6:
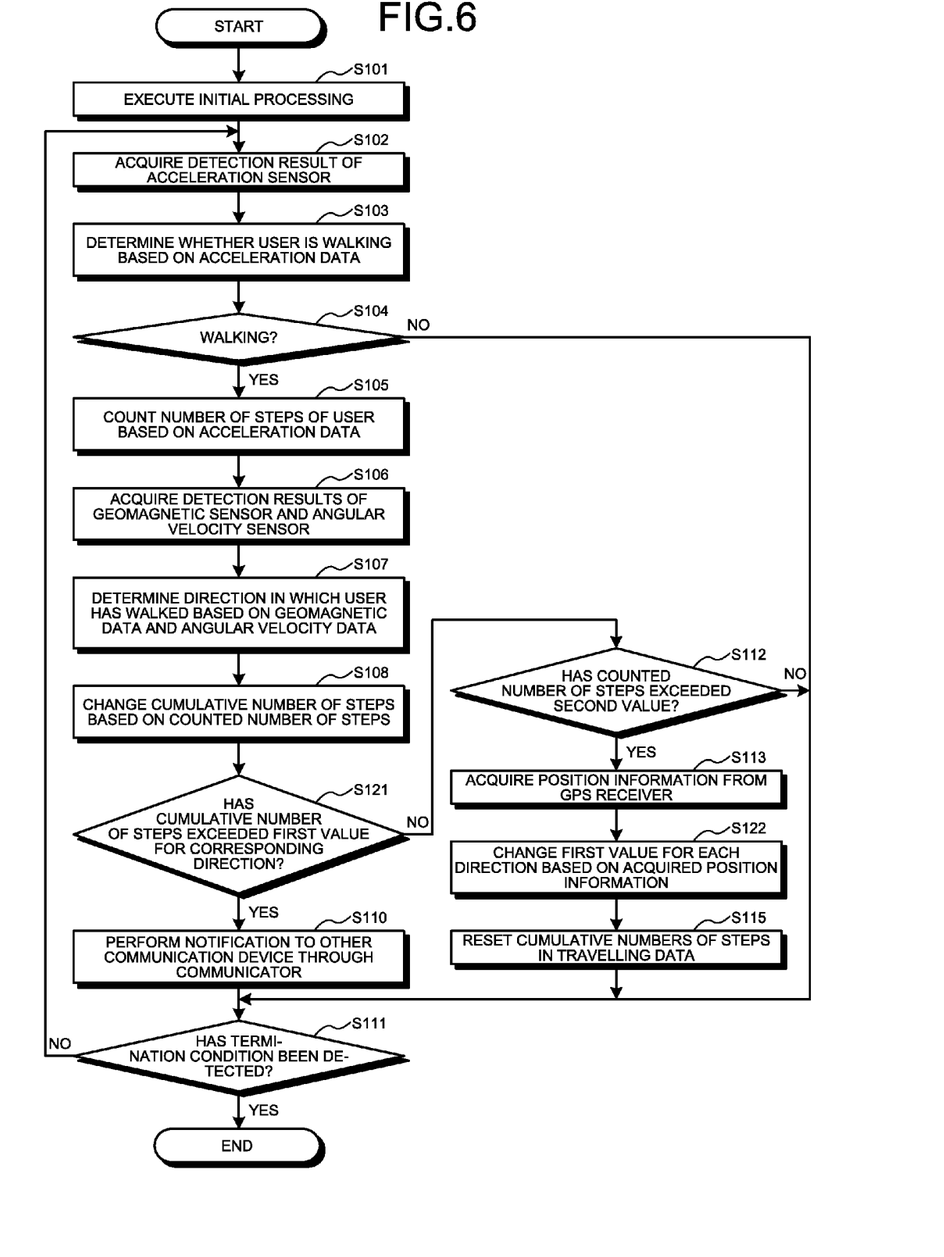
FIG. 6 is a flowchart illustrating a procedure of another example of the control by the smartphone.

FIG. 6 is a flowchart illustrating a procedure of another example of the control by the smartphone 1. The procedure illustrated in FIG. 6 is implemented by the controller 10 executing the control program 9A.

In the example illustrated in FIG. 6, the processes from Step S101 to Step S108, from Step S110 to Step S113, and at Step S115 are the same as the processes from Step S101 to Step S108, from Step S110 to Step S113, and at Step S115 in FIG. 4. Therefore, only the different processes are explained and the explanations of the same processes are omitted.

When the cumulative number of steps is changed based on the counted number of steps (Step S108), the controller 10 proceeds to Step S121. At Step S121, the controller 10 compares the cumulative number of steps for the travelling direction and the first value R for the corresponding direction, and determines whether the cumulative number of steps for the travelling direction has exceeded the first value R for the corresponding direction. When the cumulative number of steps for the travelling direction has not exceeded the first value R for the corresponding direction (No at Step S121), the controller 10 proceeds to Step S112 which has already been described. When the cumulative number of steps for the travelling direction has exceeded the first value R for the corresponding direction (Yes at Step S121), the controller 10 proceeds to Step S110. At Step S110, the controller 10 performs the notification to other communication device through the communicator 6, and proceeds to Step S111 which has already been described.

Upon acquiring the position information from the GPS receiver 18 at Step S113, the controller 10 proceeds to Step S122. At Step S122, the controller 10 changes the first value R for each direction based on the acquired position information. For example, the controller 10 calculates a displacement amount between the acquired position information and the reference position. The controller 10 determines the value (steps) for each direction by applying the position to which the calculated displacement amount is reflected, the information on the area, and the information on the stride of the user to a relational expression between the position, the area, and the stride of the user. At Step S115, the controller 10 resets the cumulative numbers of steps in the travelling data 9F, and proceeds to Step S111 which has already been described.

Another example of the smartphone according to the embodiments will be explained below. The smartphone according to the embodiments has the same configuration as that of the smartphone 1 illustrated in FIG. 1 except for different functions of the control program 9A. The embodiments will be explained below by using the smartphone 1 as an example.

For example, the user may sometimes play on a bicycle instead of walking. In this case, the control program 9A can implement monitoring of the user by changing the cumulative number of steps to the cumulative time. The control program 9A of the smartphone 1 can provide the function of determining whether the notification to other communication device is performed based on the cumulative time of the time during which the user travels. The control program 9A may combine the cumulative number of steps with the cumulative time. The control program 9A can provide the function of counting the time for which the user travels. For example, the control program 9A provides the function of determining whether the user is in the travelling state in which he/she is travelling by a bicycle based on the acceleration data 9B.

The travelling data 9F includes the cumulative time for each of the directions in a predetermined area. For example, when the travelling time of the user in the travelling state is counted, the travelling data 9F updates the cumulative time. The travelling data 9F may include, for example, the total time since the start of monitoring the travelling.

The setting data 9Z includes a determination information used to determine the cumulative time of the user. The determination information includes, for example, a third value and a fourth value. The third value is used when it is determined whether the travelling of the user is to be notified to other communication device based on the cumulative time. The fourth value is used when it is determined whether the position information of the user is acquired based on the measured time. The fourth value can be a value for determining, for example, a timing at which the GPS receiver 18 is caused to receive the position information.

Figure 7:
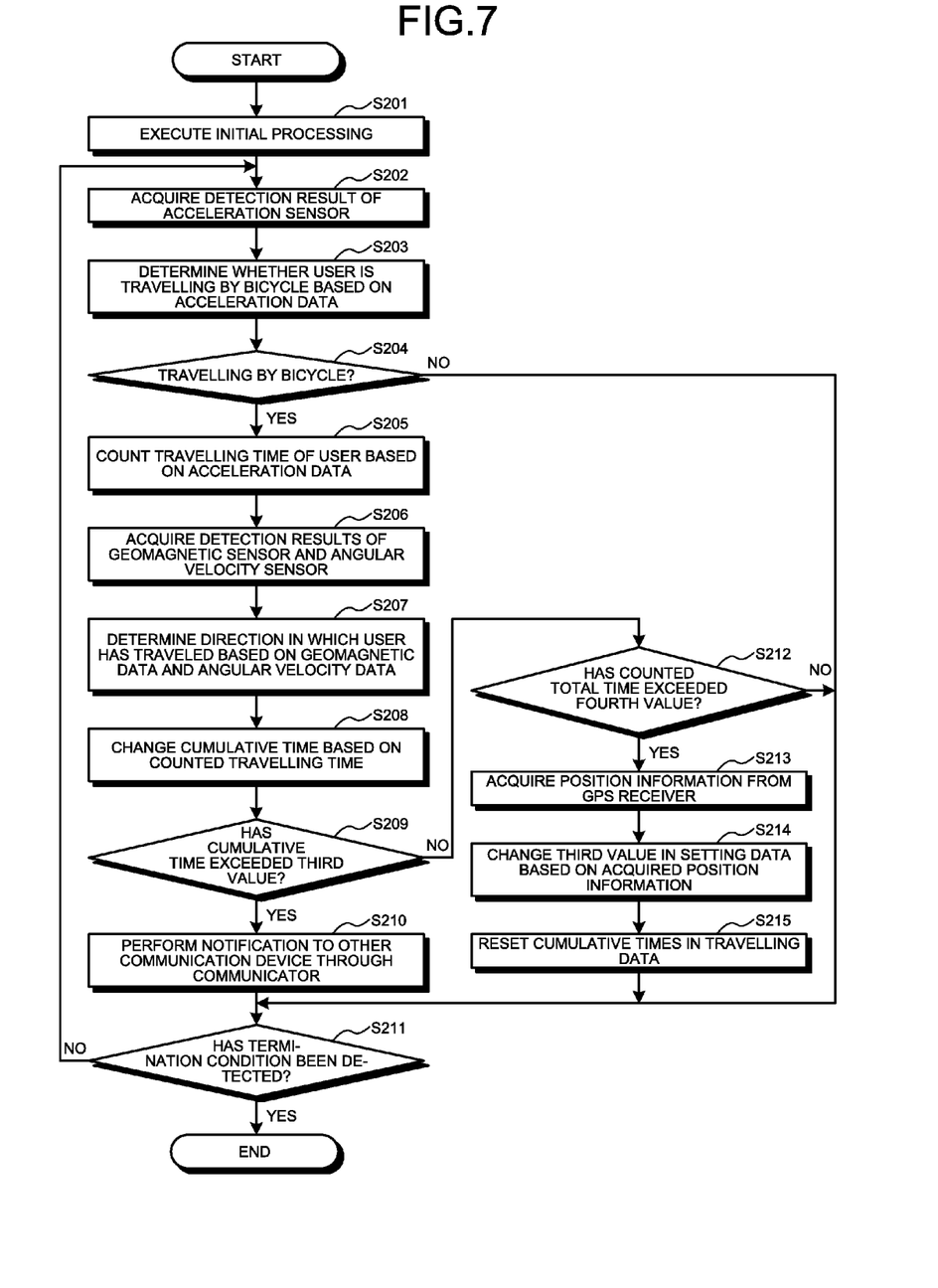
FIG. 7 is a flowchart illustrating a procedure of still another example of the control by the smartphone.

FIG. 7 is a flowchart illustrating a procedure of still another example of the control by the smartphone. The procedure illustrated in FIG. 7 is implemented by the controller 10 executing the control program 9A. The procedure illustrated in FIG. 7 is repeatedly executed by the controller 10. The procedure illustrated in FIG. 7 may be configured to start execution according to, for example, a predetermined trigger. The predetermined trigger includes, for example, cases when a pairing state with other communication device is disconnected, when the smartphone 1 is started up, when a monitoring request is accepted, and when the travelling of the smartphone 1 is started.

As illustrated in FIG. 7, the controller 10 of the smartphone 1 executes initial processing at Step S201. For example, when executing the initial processing, the controller 10 can execute processing of determining the first value R and a plurality of directions based on the current position of the smartphone 1, the geomagnetism value, the angular velocity value, and the like. As for the directions, any one of 4, 8, and 16 directions can be set. Upon completion of the initial processing, the controller 10 proceeds to Step S202.

At Step S202, the controller 10 acquires the detection result of the acceleration sensor 15. For example, the controller 10 stores the acquired detection result in the acceleration data 9B. At Step S203, the controller 10 determines whether the user is travelling by bicycle based on the acceleration data 9B. For example, when the acceleration pattern indicated by the acceleration data 9B matches the acceleration pattern when the user is travelling by bicycle, the controller 10 determines that the user is travelling by bicycle. When it is determined that the user is travelling by a bicycle (Yes at Step S204), the controller 10 proceeds to Step S205.

At Step S205, the controller 10 counts the travelling time of the user based on the acceleration data 9B. For example, the controller 10 counts the travelling time by bicycle for a predetermined time based on the acceleration pattern of the acceleration data 9B. For example, the controller 10 counts the travelling time by separating the time when the bicycle is used for the travelling and the time when the bicycle is not used for the travelling for the predetermined time. The controller 10 reflects the counted travelling time to the total time in the travelling data 9F and proceeds to Step S206.

At Step S206, the controller 10 acquires the detection results of the geomagnetic sensor 16 and the angular velocity sensor 17. For example, the controller 10 stores the acquired detection results in the geomagnetic data 9C and the angular velocity data 9D. At Step S207, the controller 10 determines a direction in which the user has travelled by bicycle based on the geomagnetic data 9C and the angular velocity data 9D. For example, it is possible that the controller 10 detects the orientation (direction) of the smartphone 1 based on the geomagnetism value and the angular velocity value and determines the direction of the travelling of the user based on the orientation (direction). The controller 10 determines the direction and proceeds to Step S208.

At Step S208, the controller 10 changes the cumulative time based on the counted travelling time. For example, the controller 10 adds the counted travelling time to the cumulative time in the direction determined at Step S207. The controller 10 subtracts the counted travelling time from the cumulative time for the direction opposite to the determined direction. Upon completion of the change in the cumulative time, the controller 10 proceeds to Step S209.

At Step S209, the controller 10 compares the cumulative time with the third value. When the cumulative time has exceeded the third value (Yes at Step S209), the controller 10 proceeds to Step S210. At Step S210, the controller 10 performs the notification to other communication device through the communicator 6. For example, the controller 10 may transmit information for the notification that the cumulative time has exceeded the third value to other communication device. For example, the controller 10 may transmit the information for notification that the user has been out of the specific area to other communication device. Upon completion of the notification, the controller 10 proceeds to Step S211.

At Step S211, the controller 10 determines whether a termination condition has been detected. The termination condition includes, for example, conditions such as detection of acceptance of a monitoring termination request, detection of re-pairing with other communication device, and detection of continuation of user's stop state for a predetermined time. When it is determined that the termination condition has not been detected (No at Step S211), the controller 10 returns to Step S202 which has already been described. When it is determined that the termination condition has been detected (Yes at Step S211), the controller 10 ends the procedure illustrated in FIG. 7.

When the cumulative time has not exceeded the third value (No at Step S209), the controller 10 proceeds to Step S212. At Step S212, the controller 10 compares the counted total time with the fourth value. When the counted total time has not exceeded the fourth value (No at Step S212), the controller 10 proceeds to Step S211 which has already been described. When the counted total time has exceeded the fourth value (Yes at Step S212), the controller 10 proceeds to Step S213.

At Step S213, the controller 10 acquires the position information from the GPS receiver 18. For example, the controller 10 causes the GPS receiver 18 to receive the position information and stores the position information acquired from the GPS receiver 18 in the position data 9E. Upon acquisition of the position information, the controller 10 proceeds to Step S214.

At Step S214, the controller 10 changes the third value in the setting data 9Z based on the acquired position information. For example, the controller 10 determines the position of the smartphone 1 based on the acquired position information, and changes the third value based on a displacement amount of the position of the smartphone 1. For example, the controller 10 changes the third value based on the time that cancels out the time for the travelling in a direction different from the travelling direction. At Step S215, the controller 10 resets the cumulative times in the travelling data 9F. For example, the controller 10 resets a plurality of cumulative times corresponding to a plurality of directions to 0. Upon completion of the reset of the cumulative times, the controller 10 proceeds to Step S211 which has already been described.

When it is determined that the user is not travelling by bicycle (No at Step S204), the controller 10 proceeds to Step S211 which has already been described.

In this way, it is possible that the smartphone 1 determines the direction in which the user has travelled by bicycle and performs the notification to other communication device when the cumulative time for any one of the directions exceeds the third value. The smartphone 1 can determine the travelling direction and the travelling time of the user based on the acceleration value and the geomagnetism value or based on the acceleration value and the angular velocity value. As a result, the smartphone 1 can monitor the travelling of the user by bicycle based on the detection results of the sensors without frequently operating the GPS receiver 18. The smartphone 1 has only to drive the sensors for monitoring the travelling of the user, thus can achieve power consumption. Moreover, even if the user is located in a place where the GPS receiver 18 cannot receive signals or where reception accuracy is poor, the smartphone 1 can monitor the travelling of the user based on the detection results of the sensors.

For the procedure illustrated in FIG. 7, the case of using one third value for a plurality of directions has been explained, however, the procedure is not limited thereto. For example, the smartphone 1 may provide a third value for each of the directions. In that case, the processes at Steps S209 and S214 illustrated in FIG. 7 may be changed.

For example, Step S209 may be changed to a process of comparing the cumulative time with the third value in the same direction. For example, Step S214 may be changed to a process of changing the third value for each direction based on the acquired position information. For example, Step S214 includes a process of calculating a displacement amount between the acquired position information and the reference position and applying the displacement amount, the area information, and travelling speed to a relational expression to determine the time to be set as the third value for each direction.

In the embodiments, the case in which the smartphone 1 determines the travelling direction of the user based on the geomagnetism value and the angular velocity value has been explained, however, the embodiments are not limited thereto. For example, the smartphone 1 may determine the travelling direction of the user based on the geomagnetism value or the angular velocity value.

In the embodiments, the case in which the smartphone 1 performs the notification to other communication device when the user has been out of the area E has been explained, however, the embodiments are not limited thereto. For example, the smartphone 1 may perform the notification to other communication device when the user approaches boundary of the area E. In that case, the first value and the third value can be provided by setting the number of steps and the time that the user is likely to go out of the area E.

In the embodiments, the case in which the smartphone 1 performs the notification to other communication device through the communicator 6 when the travelling of the user satisfies the predetermined conditions has been explained, however, the embodiments are not limited thereto. For example, the smartphone 1 may perform the notification to other communication device and warn the user of the travelling.

In the embodiments, the smartphone 1 has been explained as an example of the mobile device, however, the mobile device according to the present application is not limited to the smartphone. The mobile device according to the present application may be a mobile electronic device other than the smartphone. Examples of mobile electronic devices include, but are not limited to, mobile phones, tablets, digital cameras, smart watches, media players, electronic book readers, navigators, and gaming devices.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A mobile device comprising:
   a communicator configured to communicate with another communication device;
   an acceleration sensor configured to detect an acceleration value;
   a direction sensor configured to detect a change of a direction of the mobile device; and
   at least one controller configured to
   determine number of steps of a user of the mobile device based on the acceleration value, and a direction of walking of the user based on the change of the direction of the mobile device,
determine a first cumulative number of steps of the walking of the user in a first direction,
subtract a second cumulative number of steps in a second direction opposite to the first direction from the first cumulative number of steps to obtain a third cumulative number of steps,
perform notification to the other communication device through the communicator when the third cumulative number of steps exceeds a first value, and
stop notification to the other communication device through the communicator when the first cumulative number of steps exceeds the first value and the third cumulative number of steps fails to exceed the first value.

2. The mobile device according to claim 1, wherein the direction sensor is a geomagnetic sensor which is configured to detect a geomagnetism value.

3. The mobile device according to claim 1, wherein the direction sensor is an angular velocity sensor which is configured to detect an angular velocity value.

4. The mobile device according to claim 1, further comprising:
a receiver configured to receive position information for specifying a position of the mobile device, wherein
the at least one controller is further configured to cause the receiver to receive the position information each time the number of steps exceeds a second value, and change the first value according to the position of the mobile device determined based on the position information.

5. The mobile device according to claim 4, wherein, when the first value is changed according to the position of the mobile device,
the at least one controller is further configured to reset the cumulative number of steps for each of the directions to 0.

6. The mobile device according to claim 1, wherein the first value is a value different for each direction.

7. The mobile device according to claim 1, wherein the at least one controller is further configured to compare each of the cumulative numbers of steps in 4, 8, or 16 directions with the first value.

8. A control method of a mobile device including a communicator configured to communicate with another communication device, an acceleration sensor configured to detect an acceleration value, and a direction sensor configured to detect a change of a direction of the mobile device, the control method comprising:
determining number of steps of a user of the mobile device based on the acceleration value, and a direction of walking of the user based on the change of the direction of the mobile device;
determining a first cumulative number of steps of the walking of the user in a first direction;
subtracting a second cumulative number of steps in a second direction opposite to the first direction from the first cumulative number of steps to obtain a third cumulative number of steps;
performing notification to the other communication device through the communicator when the third cumulative number of exceeds a first value; and
stopping notification to the other communication device through the communicator when the first cumulative number of steps exceeds the first value and the third cumulative number of steps fails to exceed the first value.

9. The control method of a mobile device according to claim 8, wherein the direction sensor is a geomagnetic sensor which is configured to detect a geomagnetism value.

10. The control method of a mobile device according to claim 8, wherein
the direction sensor is an angular velocity sensor which is configured to detect an angular velocity value.

11. A non-transitory storage medium that stores a control program for causing, when executed by a mobile device including a communicator configured to communicate with another communication device, an acceleration sensor configured to detect an acceleration value, and a direction sensor configured to detect a change of a direction of the mobile device, the mobile device to execute:
determining number of steps of a user of the mobile device based on the acceleration value, and a direction of walking of the user based on the change of the direction of the mobile device;
determining a first cumulative number of steps of the walking of the user in a first direction;
subtracting a second cumulative number of steps in a second direction opposite to the first direction from the first cumulative number of steps to obtain a third cumulative number of steps;
performing notification to the other communication device through the communicator when the third cumulative number of steps exceeds a first value; and
stopping notification to the other communication device through the communicator when the first cumulative number of steps exceeds the first value and the third cumulative number of steps fails to exceed the first value.

12. The non-transitory storage medium according to claim 11, wherein
the direction sensor is a geomagnetic sensor which is configured to detect a geomagnetism value.

13. The non-transitory storage medium according to claim 11, wherein
the direction sensor is an angular velocity sensor which is configured to detect an angular velocity value.

* * * * *